United States Patent [19]
Kliewer

[11] Patent Number: 5,510,863
[45] Date of Patent: Apr. 23, 1996

[54] POCKET TRIPOD

[76] Inventor: Waldemar Kliewer, 9, Niewaldstrasse, 33729 Bielefeld, Germany

[21] Appl. No.: 153,188

[22] Filed: Nov. 17, 1993

[30] Foreign Application Priority Data

Nov. 24, 1992 [DE] Germany .................. 42 39 405.8

[51] Int. Cl.⁶ ................................................ G03B 29/00
[52] U.S. Cl. ........................................................ 354/81
[58] Field of Search ................................... 354/81, 293

[56] References Cited

U.S. PATENT DOCUMENTS

| | | | |
|---|---|---|---|
| 3,586,278 | 6/1971 | Simons | 354/81 |
| 3,952,982 | 4/1976 | Lewis | 354/81 |
| 4,933,691 | 6/1990 | Leslie | 354/81 |
| 5,003,328 | 3/1991 | Gaynor | 354/81 |
| 5,073,788 | 12/1991 | Lingwall | 354/81 |
| 5,275,364 | 1/1994 | Burger et al. | 354/81 |

Primary Examiner—David M. Gray
Attorney, Agent, or Firm—Burns, Doane, Swecker & Mathis

[57] ABSTRACT

The invention relates to a tripod for a photo camera or a video camera, whose head piece exhibits a mounting for the respective device to be mounted and the mounting is swivel-mounted by means of a ball or swivel axis joint; and the head piece is connected to a column, to which removable support legs for forming the base element are attached, and whereby to attach the tripod to objects a clamping or gripping fixture is connected to the column. To this end, according to the invention the head piece and base element can be separated from the column; and head, base and column can be combined with means to make the tripod stable and/or to produce a stable attachment of the tripod; and the means to produce the stability and/or to attach to the environment can be adjusted by combining the individual means. In this manner a tripod is provided whose forms can be modified by assembling the combined individual means in different ways and which can be adapted to the peculiarities of nature for different applications, in particular in the field.

23 Claims, 6 Drawing Sheets

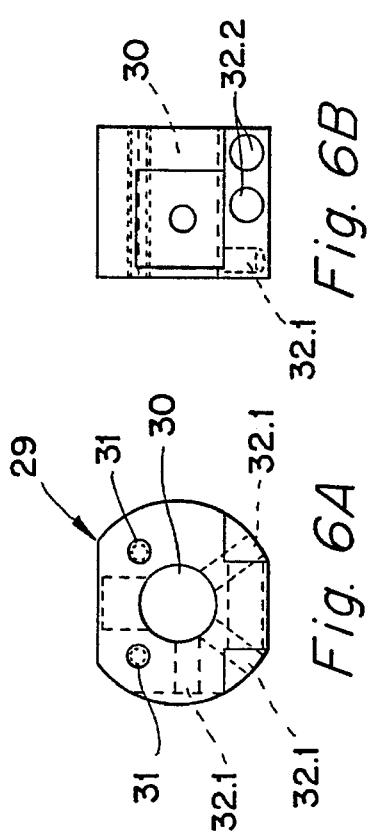
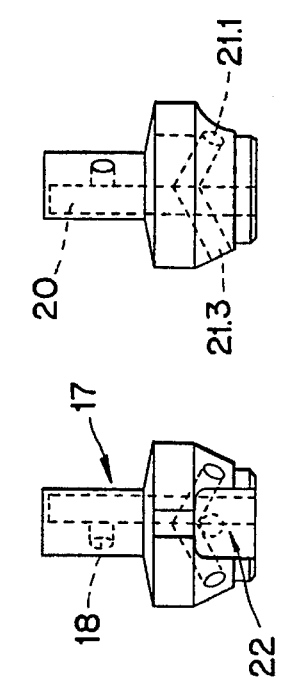
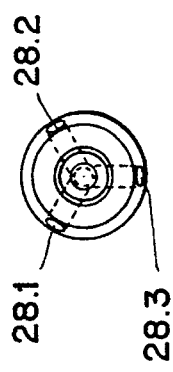
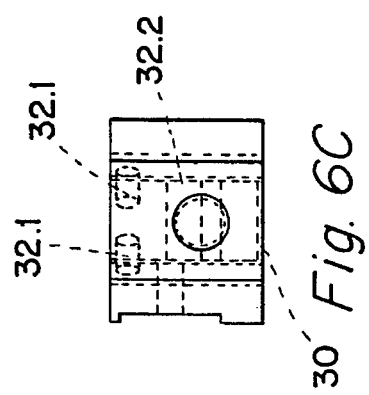
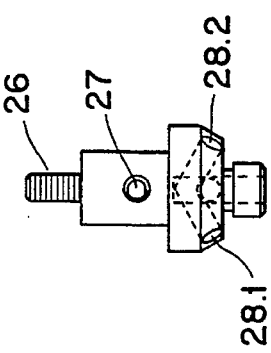
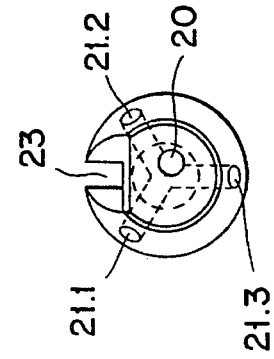

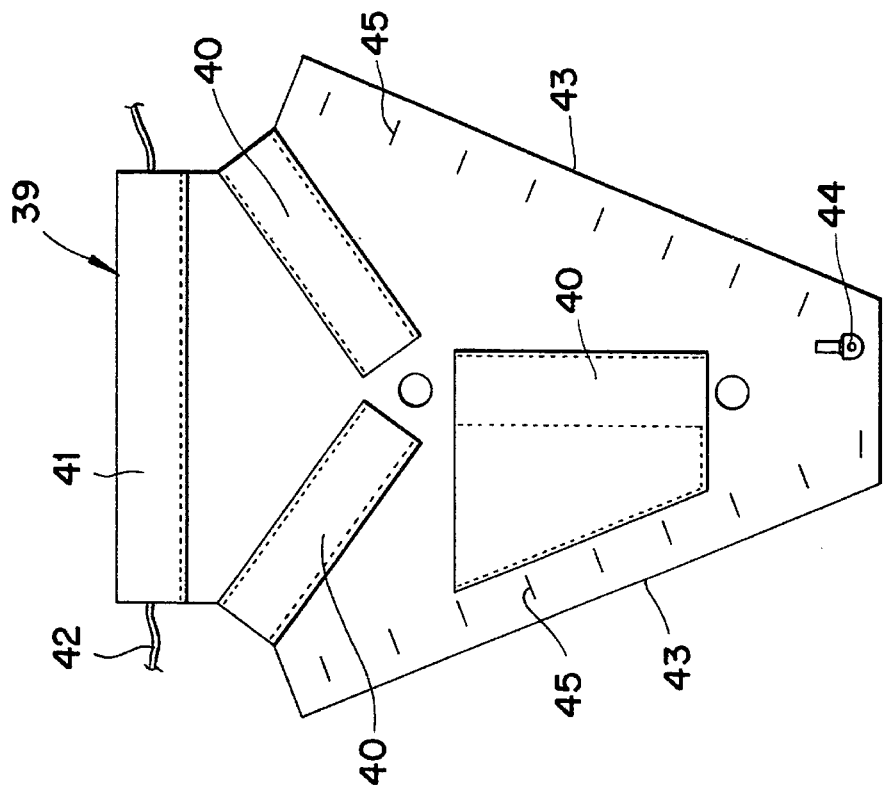
Fig. 10
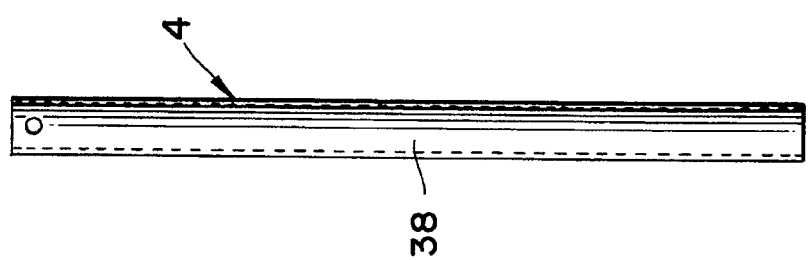
Fig. 9
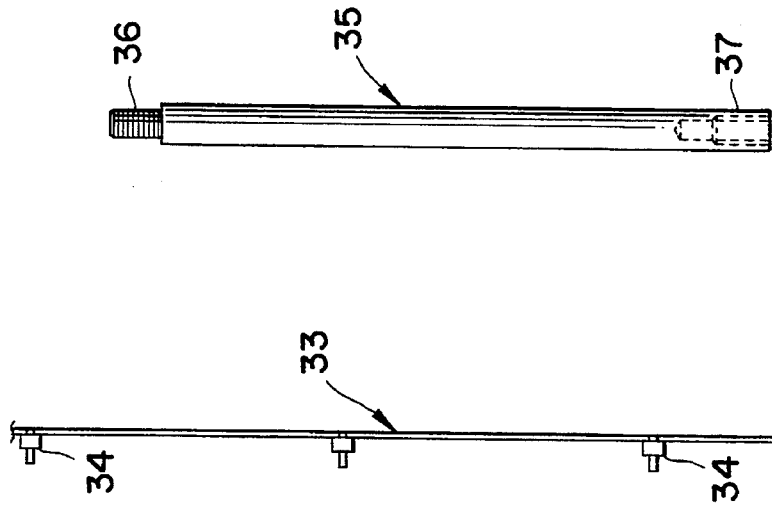
Fig. 8
Fig. 7

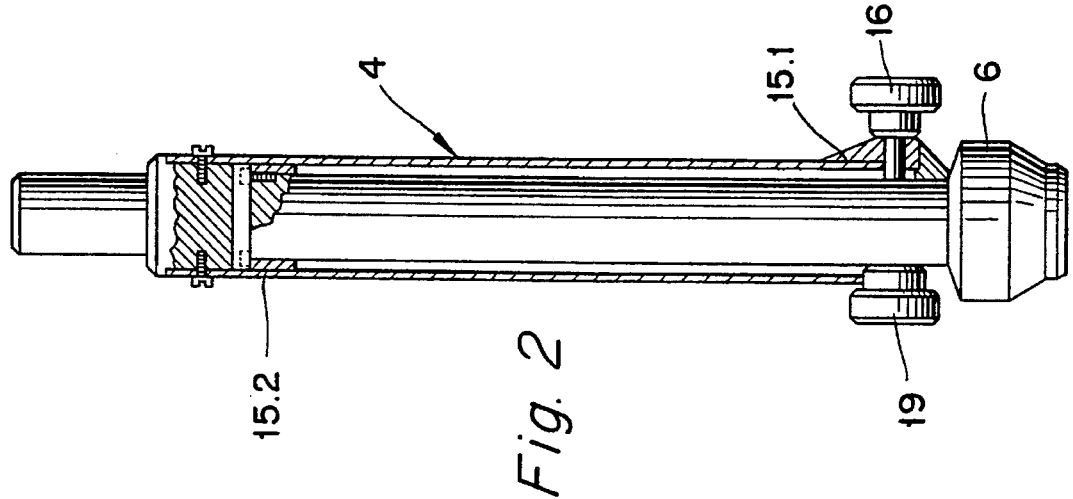
Fig. 2
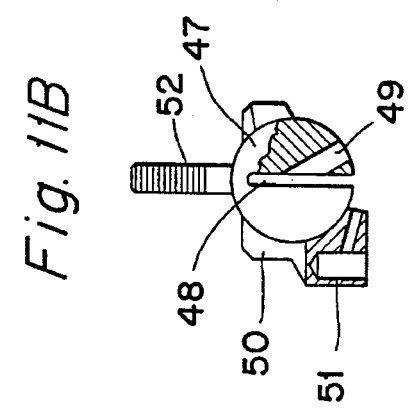
Fig. 11A
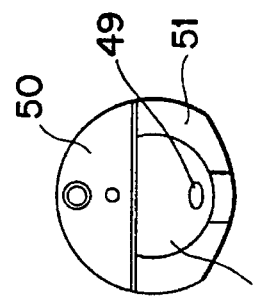
Fig. 11B
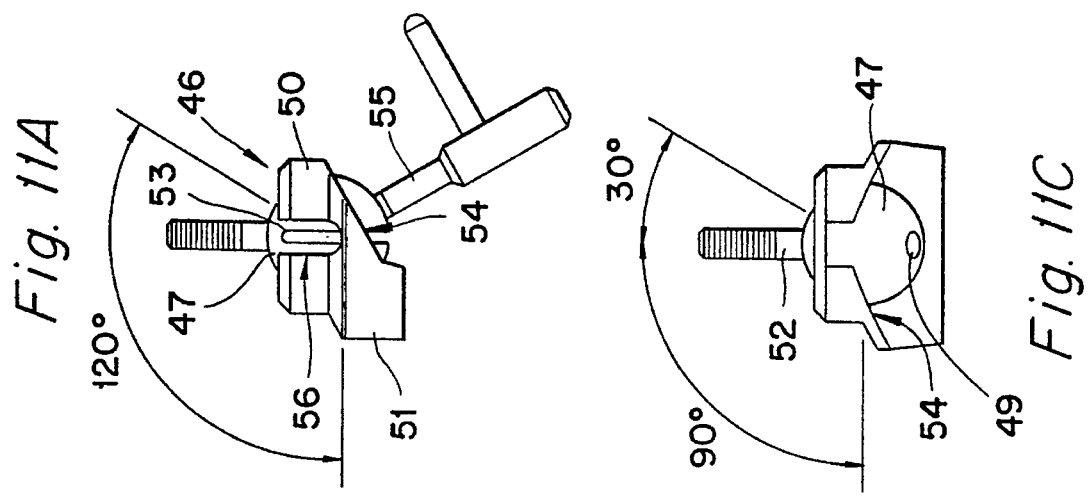
Fig. 11C
Fig. 11D

POCKET TRIPOD

BACKGROUND OF THE INVENTION

The invention relates to a tripod for a photo camera or a video camera, whose head piece exhibits a mounting for the respective device to be mounted and the mounting is swivel-mounted by means of a ball or swivel axis joint; and the head piece is connected to a column, to which removable support legs for forming the base element are attached, and whereby to attach the tripod to objects a clamping or gripping fixture is connected to the column.

According to the prior art there exist so-called pocket tripods that are used especially for travelling. The pocket tripod has a head piece that has a ball and socket joint with a mounting for the photo camera. The ball and socket joint can be arrested by means of a setscrew in suitable angular positions of the mounting carrying the camera. A clamp can be attached to the column of such pocket tripods, in order to mount the column and thus the tripod, for example, on a table top or similar objects. To reduce the size of such a tripod, there is the option of unscrewing the three support legs from the base element and of inserting through an opening on the underside of the column, in order to store in the interior of the column.

Such tripods known from the prior art are extremely limited in their field of application and/or with respect to the possibilities for modifications, a feature that affects the use of such a tripod in the field. In addition, such small pocket tripods lack the necessary standing or fastening stability, in order to be able to work with heavy camera housings and telephoto lenses, using additional flash devices. Such tripods Known from the prior art tend, therefore, to tilt on account of their small positioning area. Furthermore, such small tripods, which are equipped with such a vice grip, can be attached only to table tops or doors. With such a small vice grip it is not possible to attach to brickwork or trees, so that such tripods can be used only in rooms. Such small tripods can be used in the field only with great difficulty, especially since there must exist optimal conditions or special features. It is especially difficult, for example, on loose sand, on steep slopes or rocky foundation.

In addition, such known pocket tripods do not offer an adequate stability with the use of cameras with long lenses, since the tripod body tends to tilt owing to the shift in its center of gravity, and frequently means have to be applied to counter brace the tripod body. The adapter screw to fasten the device is tightened then in such a manner that in so doing the camera housing is damaged because the adapter screw was over-torqued.

Therefore, the object of the invention is to remedy the shortcomings of the prior art pocket tripod in such manner that with respect to its possible uses it can be better adapted to the environment while at the same time the standing or fastening possibility of such a tripod is improved.

SUMMARY OF THE INVENTION

This problem is solved by the invention in that the head piece and base element can be separated from the column, and that head, base and column piece can be combined with means to make the tripod stable and/or to produce a stable attachment of the tripod, and that the means to produce the stability and/or to attach to the environment can be adjusted by combining the individual means. Since the three main elements—head, base and column—can be separated, the goal is reached that the tripod offers possibilities for modification. In addition, the invention provides means that can be connected to the column or the base or the head, in order to adapt the stability and/or the attachment to the surrounding objects in rooms and in nature. To this end, it is especially advantageous that these means can be modified or connected together in such a manner that they can be adapted to the respective surroundings. Thus, the means can be adapted, for example, to sandy ground, to rocky ground or the tripod can be modified in such a manner by the means that the tripod can be attached to a tree or to a wall or the like. Owing to this adaptability of such a pocket tripod, the field of application is no longer limited to the region of the house but rather it is also possible to render such a pocket tripod useful especially for globe trotters in nature. Such a compact tripod enables also for bike riders, canoeists, animal photographers and other persons an individual use of the tripod.

To this end, means such as a universal adapter, a base seat, a column slide bushing, extension rods that can be screwed together, and a cord and a cloth cutout are used in an advantageous manner. These objects to be defined in detail individually in the following can be combined with the column or the head or the base in such a manner that the tripod can be adapted to the respective structure of the environment.

To this end, it is expedient that the end of the universal adapter has a threaded stem and the opposite end exhibits a taphole, and that sloped tapholes are arranged in the center in order to attach supporting legs. With the universal adapter a small pocket tripod can be produced in a simple manner by screwing the supporting legs into the sloped tapholes, and by screwing the device to be carried directly on the threaded stem. For additional support of the mounted device, the universal adapter has a continuous taphole that runs transversely in the center to its longitudinal extension. Additional support means such as an extension rod can be screwed into this taphole.

According to an advantageous embodiment of the invention, the end of the base seat is designed like a bushing with a transverse, continuous bore, and its opposite end has a taphole, and that sloped tapholes are also disposed in the center in order to attach supporting legs. The base seat is connected to the column by means of a bushing in such a manner that it can be inserted. At the same time it is advantageous if the connection is designed detachably, so that base seat and the column form one unit. Owing to the uniform design of the base seat and the column, the supporting legs can be inserted easily through the continuous bore in the base seat into the cavity of the column, so as to require little space for storage. In order to prevent the supporting legs from sliding out of the column, the supporting legs can be clamped into the cavity of the column by means of a screw. Just like the universal adapter, the base seat has sloped tapholes in order to screw in the supporting legs.

The opposite taphole enables either the extension rod to be screwed in, in order to modify, for example, the tripod into a ground tripod, or to screw the universal adapter to the extension rod in order to extend the tripod column in order to change the height of the tripod column.

At the same time the base seat exhibits in the region of the sloped tapholes for the supporting legs a recess with a groove to mount a spindle rod. A spindle rod with abutment can be embedded in an advantageous manner into this recess, wherein the spindle rod itself can be guided or mounted in the groove. A column slide bushing, which can be moved at a column and is guided like a bench vise on the column, interacts with the spindle rod. To this end, the column slide bushing exhibits in an advantageous manner a longitudinal guide bore for the column rod with a transverse insertion opening, where tapholes for the spindle rod are arranged on the side paraxially to the guide bore. This design enables a clamping or gripping fixture to be provided by means of the spindle rod and the column slide bushing at the column; owing to its capacity to be modified and combined with suitable means, said clamping or gripping fixture can be designed into a clamping fixture that can be rapidly and easily adapted to the objects offered in the environment. In addition, the invention offers suitable clamping reliability.

For the respective objects offered in the environment, insertion openings are run transversely parallel and radially on the column slide bushing, and the radial insertion openings are designed as tapholes. In this manner a column slide bushing, which can be moved on the column by rotating the spindle, is provided with means that can be adapted to the structures of the environment. Thus, it is possible to insert, for example, the extension rods into the parallel insertion openings or the radial tapholes. Owing to this design it has become possible to build or modify clamps or vises that can be suitably adapted, for example, to tree limbs, to doors or walls. To this end, one end of the extension rods that can be screwed together exhibits a threaded stem and the opposite end exhibits a taphole. Therefore, extension rods designed thus can be easily used to enlarge the support standing area and/or to enlarge the clamping area between the column slide bushing and the base seat.

At the same time it is especially advantageous, if the cord exhibits in accordance with its length region-by-region fastening mountings, which can be combined with the universal adapter, base seat, column slide bushing and the extension rods. The threaded stems on the cord make it possible now to produce in a simple manner a connection with the means discussed above. Thus, the cord can be laid, for example, around round or rectangular objects and can be connected to the clamping or gripping fixture at the column. Due to the clamping or gripping effect generated on the column by means of the spindle rod and the column slide bushing, the cord presses close to the object to be clamped, with the column slide bushing exhibiting a clamping effect owing to the spindle. In this manner, a tree tripod is created, for example, that can be adapted to any arbitrary limb or tree diameter. So that the cord can be connected rigidly and easily with the aforementioned means, the fastening mountings on the cord are also designed as threaded stems.

As another advantageous means, the cloth cutout exhibits a somewhat triangular shape, to which are attached straps, which extend radially on the surface of the cloth cutout and into which the supporting legs of the base can be inserted. Providing means designed as a cloth cutout with radial straps enables the tripod to be used also on soft ground, for example, sand. To this end, the cloth cutout is fastened by inserting the supporting legs into the straps as an inverted funnel below the support column. Due to the increasing support area the goal is reached that the tripod can also be placed reliably on the sand. According to an advantageous embodiment of the invention, the cloth cutout exhibits on the base side of a triangle a holder for the human body. In this manner, a so-called chest tripod can be made in a simple manner from the cloth cutout. The base side of the triangle is then laid around the neck by means of a ribbon or a chain, so that the triangular shape of the cloth cutout extends over the chest. To attach, for example, a tripod leg to this cloth cutout, the cloth cutout exhibits a threaded stem between the side legs, in order to reliably hold the tripod leg in order to form a pocket. Furthermore, the punched openings of the cloth cutout enable the modified tripod to be attached and mounted.

Furthermore, it is advantageous if the side legs of the cloth cutout exhibit slots. These slots enable not only the use of this cloth cutout as an additional pocket, where subsequently a ribbon or an extension rod, for example, is threaded through the slots, but also the attachment of other means to these slots. In so doing, the cloth cutout is made of leather, so that owing to this material design a weather-resistant material was found. Making this cloth cutout of other weather-resistant materials is also conceivable.

According to an advantageous embodiment of the invention, the column of the tripod is designed like a telescope. Designing the column like a telescope enables compact storage and an increase in the possible applications of such a pocket tripod. A head piece, which is designed either as a two or as a three swivel axis joint or as a ball and socket joint, can be placed on the column. In this manner the goal is reached that the column can be connected to the head piece required for the specific purpose.

The three swivel axis joint comprises three transverse swivel axes, each swivel axis being arrestable by means of a separate fastening element. Owing to the separate fastening element, each axis can be accurately set and arrested. In so doing, the first of the three swivel axes runs in the longitudinal direction of the axis; and the second swivel axis is arranged perpendicularly at right angles to the first; and the third swivel axis runs also perpendicularly to the second in a horizontal plane by means of a molded part attached to the end side of the second swivel axis. Due to this design of the three swivel axis joint, any conceivable plane to be photographed can be set. At the same time, the swivel joints are designed as slide bushing joints. It enables that the swivel joints exhibit a reliable guide and/or guide exhibiting poor sliding capabilities. A carrier plate with an adapter screw for the respective device or apparatus to be mounted is attached in an advantageous manner to the third swivel axis.

It is especially advantageous if a mounting to support the device to be mounted is attached to or formed on the underside of the carrier plate. At this stage the adapter with its threaded stem can be screwed, for example, into this mounting on the carrier plate, so that it offers a support against twisting the camera body on the carrier plate. It is especially important when, for example, longer lenses are mounted on the camera body.

According to a special embodiment of the invention, a head piece, designed as a ball swivel joint, can be put on the column. The ball exhibits a longitudinal, continuous slot that divides the ball body partially into two halves and in which a taphole extends at an angle transversely to the extension of the slot through one of the ball halves and that opens in the center of the ball, and that the ball is enclosed by two dish-shaped plates for a slide mounting. This design of the ball enables the ball to be used, for example, as a clamping or wedge body. If, for example, a means that strikes the inner surface of the opposite wall of the slot is screwed through the taphole, said screwed means pushes apart the two halves of the ball in such a manner that the circumference of the ball halves pushes on the inside of the dish-shaped plates. In this manner the ball can be rigidly clamped in such a manner that it cannot swivel out of the mounting. At the same time the ball exhibits a threaded stem for a device, which is to be mounted and which lies in the slot's plane of extension and is mounted on the circumference of the ball so as to be perpendicular to the base of the slot in the ball. By arranging the threaded stem directly on the ball, a small compact joint can be produced in this manner.

It is expedient if the dish-shaped plates are connected together in parallel, and if the upper dish-shaped plate exhibits cruciform grooves, and the bottom plate exhibits in the region of the taphole a sloped opening. This sandwich construction of the plates enveloping the ball forms the housing that suffices to clamp the ball. The cruciform grooves in the upper dish-shaped plate enable the threaded stem to be embedded there, if, for example, large size pictures are to be taken with the mounted device. At the same time it is expedient if the bottom plate exhibits in the region of the taphole a sloped opening. Providing the opening of the housing on the underside enables screwing a dowel pin from the bottom, for example, into the taphole, in order to expand the spherical surfaces between the dish-shaped plates. With the opening on the underside the goal is reached that a sufficient adjusting region is offered the dowel pin.

Furthermore, the goal is reached in an especially advantageous manner by means of such a ball swivel joint that the adjustment and/or the swivelling of a device mounted on the ball can be done with one hand. Thus, the dowel pin is released with one hand, thus holding the mounted device with the dowel pin to prevent said device from swivelling itself. The invention accomplishes this by connecting the dowel pin directly to the ball and thus to the device, whereby the camera is swivelled by means of the dowel pin and can also be fixed again into the desired position. In so doing, the second hand can be used, for example, to change the lens or to do other mounting or attachment operations at the camera; or this design of a ball joint enables the second free hand to be located constantly at the trigger.

In summary, according to the invention the ball joint exhibits in particular the following advantages: guarantee of a reliable and rigid clamping of the ball; holding the ball and/or the joint in the released state, in order to move the optical device rapidly and reliably into the desired position, wherein the releasing operation is no longer impeded by the adjustment of the joint. The design of the ball joint facilitates the adjustment operation and/or drastically reduces the time to make said adjustment.

According to another advantageous embodiment of the invention the parts forming the tripod and the means are made of aluminum and brass parts. Owing to the use of such materials the tripod can be used during frost, heat, subject to the effect of jolts, under dirty conditions and in sand and during any weather situation and/or on any moist or dry ground.

The tripod according to the invention combines a plurality of advantages that in summarizing can be listed once again by their key words: simple and compact construction; low weight with improved stability; diverse applications; reliable mounting and holding of optical devices; the overall adjustment possibilities offer rapid and exact and/or desired positioning of the devices; enables a reliable placement, support, clamping and fastening; and guarantees a reliable holding in the hand; setting up under extreme conditions on slopes and overhangs; is insensitive to heat, frost, impact, dirt and sand; and offers a reliable holding of the camera when photographing large size pictures; which can be modified rapidly with few equipment for left-handed persons; enables the setting up of the device on loose subsoil; and enables the safe keeping of the tripod base in the tripod body.

With the tripod of the invention about 27 different designs, 14 independent tripods and more than 75 modifications and improvements can be realized.

BRIEF DESCRIPTION OF THE DRAWINGS

The tripod according to the invention and its possible modifications are explained in detail in the following with the aid of the embodiments with reference to the drawings.

FIG. 2 is a fragmented side view of the column of the tripod according to the invention;

FIG. 4A is a side view of the base seat;

FIG. 4B is a side view of the base seat, according to FIG. 4A;

FIG. 4C is a bottom view of the base seat, according to FIG. 4A;

FIG. 5A is a side view of a universal adapter;

FIG. 5B is a bottom view of a universal adapter, according to FIG. 5A;

FIG. 6A is a top view of a column slide bushing;

FIG. 6B is a side view of the column slide bushing according to FIG. 6A;

FIG. 6C is another side view of the column slide bushing according to FIG. 6A;

FIG. 7 depicts a cord according to the invention;

FIG. 8 depicts an extension rod according to the invention;

FIG. 9 depicts an extension bushing according to the invention;

FIG. 10 depicts a cloth cutout according to the invention;

FIG. 11A is a perspective view of a ball swivel joint according to the invention;

FIG. 11B is a fragmented side view of the ball swivel joint according to FIG. 11A;

FIG. 11C is a side view of the ball swivel joint according to FIG. 11 in the direction of the opening slope;

FIG. 11D is a bottom view of a ball swivel joint according to FIG. 11A;

DETAILED DESCRIPTION OF THE PREFERRED EMBODIMENTS OF THE INVENTION

Figure 1:
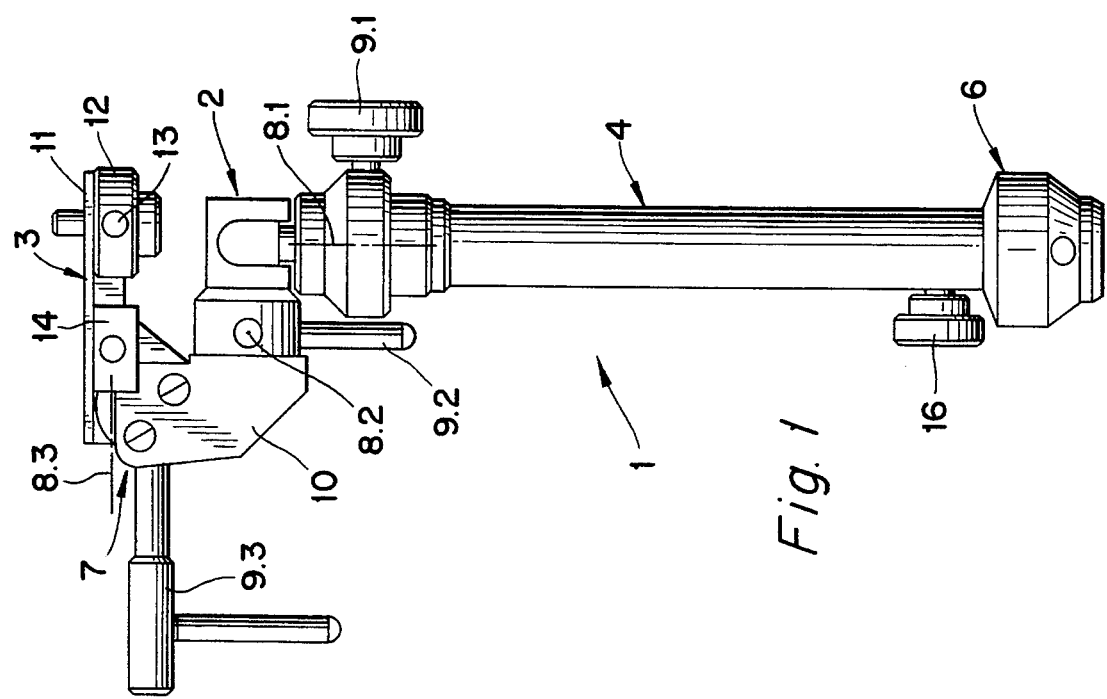
FIG. 1 is a side view of the embodiment of the tripod according to the invention.

FIG. 1 depicts an embodiment of a pocket tripod 1 for a photo camera or a video camera that is not shown in detail. The tripod 1 exhibits a head piece 2 with a mounting 3, on which the respective camera device can be placed. The mounting 3 is swivel-mounted on a column 4 by means of a swivel axis joint 7. Opposite the head piece 2 of the tripod 1 there is on the column 4 a base element 6, to which supporting legs 5 (FIG. 3) are attached to form the standing area. At the same time the head piece 2, the column and the base element 6 of the tripod 1 can be separated and dissected into individual components.

According to FIG. 1, a three swivel axis joint 7 is arranged on the column 1. The three swivel axis joint 7 is formed by three transverse swivel axes 8.1, 8.2, and 8.3. In so doing, each of the three swivel axes 8.1, 8.2, 8.3 can be arrested by means of a separate fastening element 9.1, 9.2, 9.3, which can be switched for left-handed persons. The first of the three swivel axes 8.1 coincides with the longitudinal axis of the column 4. The second swivel axis 8.2 is arranged perpendicularly at right angles to the first swivel axis 8.1. The last and third swivel axis 8.3 is also perpendicular to the second swivel axis 8.2 in a horizontal plane by means of a molded part 10 formed on the end side of the second swivel axis 8.2. At the same time the swivel joints are designed as a slide bushing joints.

A carrier plate 11 is attached with an adapter screw 12 for camera devices to be mounted (not illustrated in detail) to the third swivel axis 8.3. The adapter screw exhibits a taphole 13, into which fastening means can be screwed. The adapter screw 12 exhibits in an advantageous manner an internal taphole, so that, after separating from the carrier plate 11, the adapter screw 12 can also be connected directly to the means of the invention, for example, to produce a pocket tripod with the universal adapter 25. A counter-nut can be slid on the adapter screw 12, when the adapter screw 12 is to be used as a separate tripod (ground spike tripod). Then one or more extension supporting legs, which are pushed into the ground, are attached to the adapter screw 12. The counter nut causes the mounted device (photo camera or video camera) to be fastened reliably to the adapter screw 12 so that there is no undesired twisting.

On the underside of the carrier plate 11 there is a mounting 14 to support a mounted device against twisting on the carrier plate 11. In so doing, the universal adapter 25 can be screwed with its threaded stem 26 into the mounting 14, so that the mounted device is braced against twisting at the universal adapter. In this manner it is possible to mount in particular photo cameras with very long lenses on the carrier plate, so that the entire apparatus is prevented from twisting due to a shift in its center of gravity.

The column 4, shown in detail in FIG. 2, can be telescoped. The column 4, according to FIG. 2, comprises two movable bushings 15.1 and 15.2, which can be fixed into different vertical positions by means of a knurled-head screw 16. The base element 6, to be described in detail in the following, is inserted on the bottom end of the inside bushing 15.2.

Figure 3:
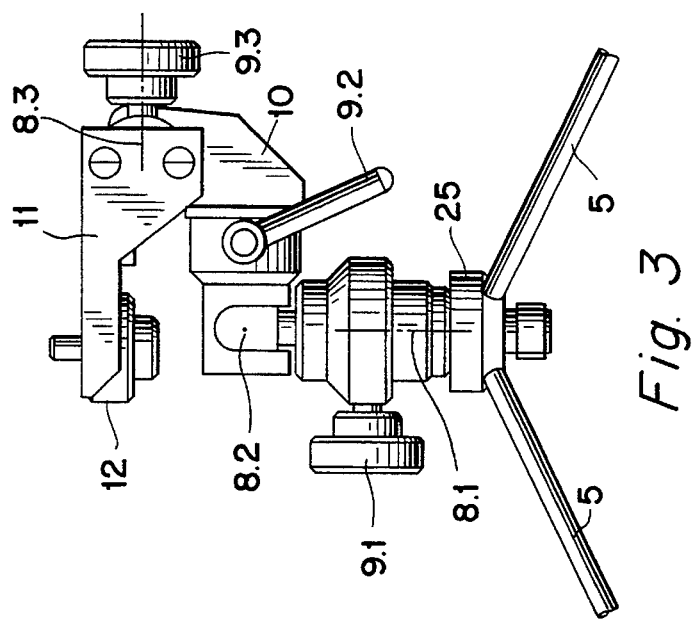
FIG. 3 is another side view of another embodiment of the tripod according to the invention.

FIG. 3 shows another embodiment of the tripod 1, where the head piece 2 is slid on the universal adapter 25. In this manner a so-called pocket tripod is obtained with simple means by removing the column 4 in a simple manner.

Figure 12:
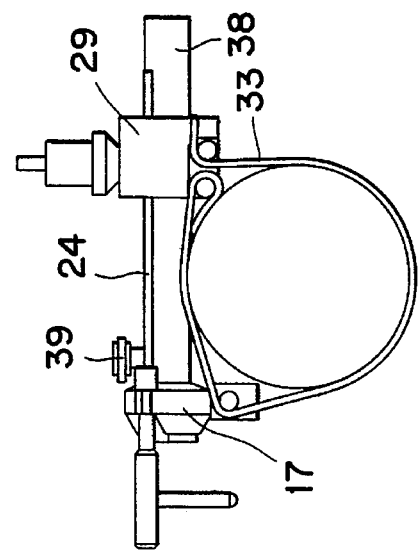
FIG. 12 depicts an embodiment of a tree or branch tripod.
Figure 13:
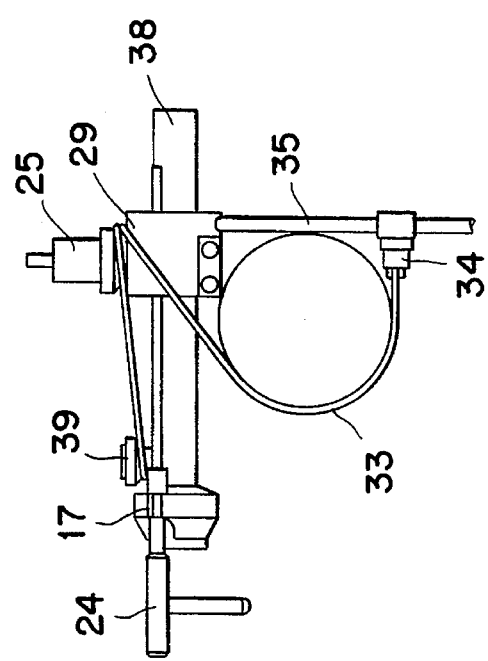
FIG. 13 depicts another embodiment of the tree tripod.
Figure 14:
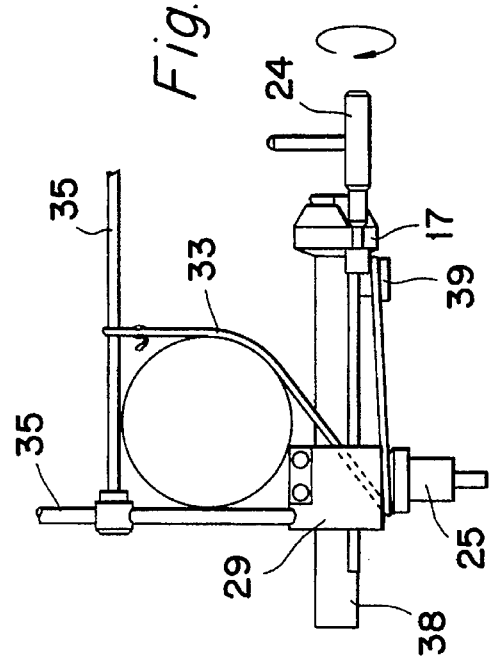
FIG. 14 depicts another modification of a tree tripod according to FIGS. 12 and 13.

FIGS. 4B and 4C show a base seat 17, which is designed according to the invention and whose end is designed like a bushing with a transverse, continuous taphole 18. The column 4 can be slid on the bushing-like part in a simple manner and attached by means of a setscrew 19 (FIG. 2) to the bottom end of the column 4. A continuous taphole 20 is arranged approximately paraxially in the base seat 17. Sloped, radial tapholes 21.1, 21.2, 21.3 are centered in the body of the base seat 17 to attach the supporting legs 5. The base seat 17 exhibits approximately in the region of the sloped radial tapholes, in particular between the extending angle of the taphole 21.1 and 21.2, a recess 22 with a groove 23. FIGS. 12, 13, 14 show this recess 22 followed by a groove 23 in which a spindle rod 24 can be clamped.

FIGS. 5A and 5B show a universal adapter 25, whose one end exhibits a threaded stem 26 and whose opposite end exhibits a taphole 27. The upper region of the universal adapter 25 up to the threaded stem 26 is designed like a bushing, so that the universal adapter can also be combined, for example, with the column 4. There is also the possibility of screwing the adapter screw 12 directly on the threaded stem, in order to get thus a small table tripod, when the supporting legs 5 are screwed to the radial tapholes 28.1, 28.2, and 28.3, which are also sloped and embedded in the center.

FIGS. 6A and 6C show a column slide bushing 29, which exhibits a longitudinal guide bore 30 for the column 4. The column slide bushing 20 exhibits paraxially to the guide bore 30 opposing tapholes 31, through which the one spindle rod 24 (FIGS. 12, 13, and 14) can be screwed. In addition, the column slide bushing 29 exhibits insertion openings 32, which extend transversely to the guide bore 30. The insertion openings 32 run parallel and radially, the radial insertion openings being designed as tapholes.

FIGS. 7, 8, and 9 show additional means that can be used for the respective application of the pocket tripod 1. Thus, FIG. 7 shows a cord 33, which exhibits in accordance with its length segment-by-segment fastening mountings 34, designed at the cord 33 also as threaded stems. These fastening mountings 34 can be put together with the universal adapter 25, the base seat 17, the column slide bushing 29 and the extension rod 35.

FIG. 8 shows such an extension rod 35, whose end exhibits a threaded stem 36 and whose opposite end exhibits a taphole 37. FIG. 9 shows a bushing rod 38, which can also be slid on the universal adapter 25. The bushing rod 38 can also be used as the column 4.

FIG. 10 shows the cloth cutout 39, which is designed according to the invention and which has a triangular shape. The surface of the cloth cutout 39 has radial straps 40, which are sewn on the surface of the cloth cutout 39. The supporting legs 5 of the base element 6 can be inserted into the radial straps 40, so that an inverted funnel is formed. This funnel formation enables setting the tripod 1 also on sandy soil. The cloth cutout 39 exhibits in an advantageous manner on its base side 41 of its triangular shape a holder 42. This holder 42 is designed as a ribbon, which can be laid around the neck, so that the cloth cutout 39 can be worn on the chest. To use the cloth cutout 39 as a chest tripod, a threaded stem 44 is sewn between the side legs 43 of the cutout 39. The means, listed already above, can be screwed to the threaded stem 44, in order to build thus a suitable tripod, but the threaded stem is primarily for holding a supporting leg to produce a container of the cloth cutout. Furthermore, the cloth cutout 39 exhibits on the leg sides 43 slots 45 and punched openings 45 in the center. The cloth cutout 39 can be made, for example, of leather or other conceivable weather-resistant materials that can fulfill the required purpose.

FIGS 11A–11D show a ball and socket joint 46, which can be slid on the column 4 or the bushing rod 38. The ball and socket joint 46 exhibits a ball 47, which exhibits a longitudinal, continuous slot 48 dividing the ball body partially into two halves. A taphole 49 opens into the slot 48 at an angle transversely to the extension of the slot. The ball 47 itself is enveloped by two dish-shaped plates 50 and 51 for a sliding hold. A threaded rod 52 for a device to be mounted (not shown in detail) is attached on the outer circumference of the ball 47. The threaded stem 52 is attached in the plane of extension of the slot 48 on the ball's circumference perpendicularly to the slot base 53 in the ball 47. The dish-shaped plates 50 and 51 are connected together in parallel like a sandwich. Cruciform grooves 56 are milled into the upper surface of the upper dish-shaped plate 50. The bottom plate 51 has a sloped opening 54 in the region of the taphole 49, thus forming the ball and socket housing designed as a sandwich. A dowel pin 55, which can be screwed as far as the extension of the slot, can be screwed into the taphole 49. Due to the continuous taphole 49 the dowel pin 55 can be screwed into the slot 48, until it strikes the opposite slot surface. When the dowel pin 55 is screwed on further, the halves of the ball 47 expand and thus push against the inner wall of the dish-shaped plates 50 and 51 configured like a sandwich.

Thus, the ball can be rigidly clamped by means of the dowel pin 55 between the two plates 50 and 51, producing the friction lock. When the dowel pin 55 is detached, the halves of the ball retract again, so that the friction lock is cancelled again and the ball 47 can swivel back into its slide mounting (plates 50 and 51). In accordance with the chamfered opening 54, extending along the bottom plate 51, the dowel pin 55 can be swivelled within the rim of the opening 54. The swivel region of the ball 47 reaches so far that the threaded stem 52 moves into the cruciform grooves 56 in the upper plate 50. According to FIGS. 11 and 11.2, the threaded stem 52 can be swivelled as far as the surface of the upper plate 50 owing to the groove 56. The sloped opening 54 extends at an angle from the bottom plate 51 as far as the upper plate 50, in order to guarantee adequate swivelling movement with the dowel pin 55.

FIGS. 12 to 17 show individual design modifications, which can be realized with such a tripod 1 owing to the means according to the invention. FIGS. 12 to 13 show a tree or branch tripod, where the column slide bushing 29 was slid on the column 4 or on the bushing rod 38. The column slide bushing 29 is slid axially by means of the spindle rod 24 on the bushing rod 38. In addition, the spindle rod 24 is mounted in the recess 22 and in the following groove 23 of the base seat 6. While rotating the spindle rod 24 by means of the illustrated manipulation, the column slide bushing 29 moves according to the direction of rotation of the spindle rod 24 axially on the bushing rod 38. Due to the axial displacement of the column slide bushing 29, the cord 33 can be tightened and relaxed in a simple manner; said cord is laid, for example, around a branch or a tree and is fastened with an unlocking screw 39 of the tripod base, which is attached to the base seat 17, and the column slide bushing 29. Owing to the clamping effect the cord rests tightly against the object or the branch or the tree.

According to the embodiment of FIG. 13, it is also possible to screw the extension rod 35 into the radial insertion openings 32 on the column slide bushing 29, in order to attach the cord 33 to the extension rod 35 and then to divert the cord 33 by way of the universal adapter 25, also fastened to the column slide bushing 29, in order to thus induce the clamping force in the cord 33. FIG. 14 shows a similar embodiment as in FIG. 13. Another extension rod 35 is fastened perpendicularly to the extension rod 35 attached to the column guide bushing 29 by means of an adapter. Thus, the goal of wedging or encircling the branch or the tree is achieved. If the spindle rod 24 is rotated by means of manipulation according to the arrow, the cord 33 clamps the branch, so that the enveloping cross section of the extension rod construction is restricted with the cord 33.

Figure 15:
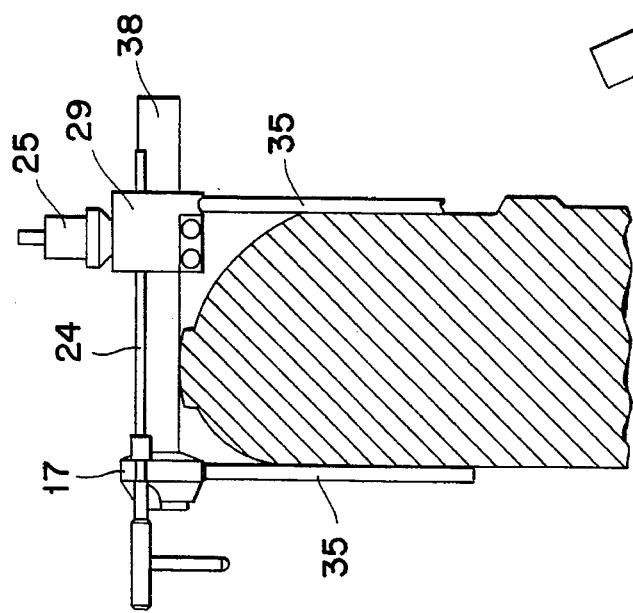
FIG. 15 depicts an embodiment of a clamping tripod.

According to another embodiment of FIG. 15, the pocket tripod 1 can also be designed or modified as a clamping or jaw tripod. In so doing, extension rods 35, which clamp between the object (in FIG. 15, for example, a fragmented car door) when the spindle rod 24 is tightened, are attached to the base seat 17 and the column slide bushing 29.

Figure 16:
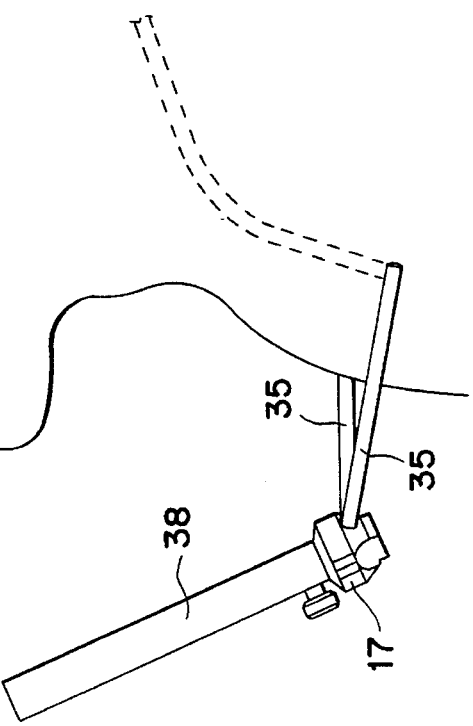
FIG. 16 depicts an embodiment of a chest tripod.

FIG. 16 shows another embodiment, where the pocket tripod 1 is designed as a chest tripod. In so doing, extension rods 35 are screwed into the sloped tapholes 21.1 and 21.2 of the base seat 17, so that a supporting angle is formed that rests on the chest of a human body. The cord 33 with its fastening mountings 34 can be attached to the ends of the extension rods 35, so that a holding ribbon for the neck is formed. Then the desired head piece 2 can be placed on the bushing rod 38 standing on the chest.

Figure 17:
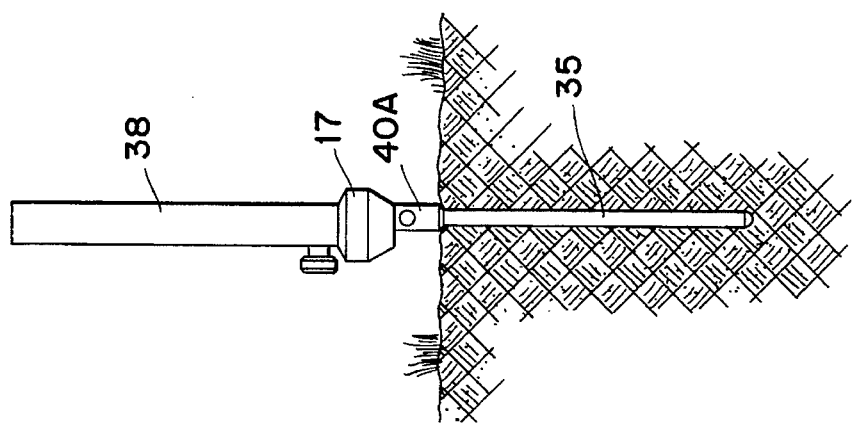
FIG. 17 depicts an embodiment of the tripod as a ground spike.

FIG. 17 shows another embodiment of the pocket tripod 1 according to the invention and its possible applications. Thus, it is possible to screw the extension rod 35 into the paraxial, continuous taphole 20 of the base seat 17, in order to obtain thus a ground spike for the pocket tripod 1. In addition, an adapter 40 can be provided that guarantees a stable fixing in position of the extension rod 35 in the continuous taphole 20 of the base seat 17. Depending on the nature of the ground, the ground spike can be modified accordingly by means of additional extending extension rods 35.

Only a few design modifications of the pocket tripod according to the invention were presented within the scope of the disclosure. However, it is conceivable to build a number of designs with the tripod, so that by means of modification and combination of individual means the pocket tripod 1 offers unlimited possibilities with respect to its application in closed rooms and in the field.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A camera support structure comprising:

a camera holder;

a head piece mountable to said camera holder to permit swiveling of said camera holder to different positions;

a column having axial openings in its ends onto which said head piece is mountable;

a plurality of supporting legs for supporting said column said supporting legs having a screw-thread at one end thereof;

a hollow slide bushing mountable on said column for adjustable movement therealong in the direction of a longitudinal axis of said column, said slide bushing including a lateral recess formed in a side wall thereof;

a universal adapter containing threaded tapholes for receiving said supporting legs, said universal adapter being selectively mountable to said recess of said slide bushing and to said head piece; and a base seat mountable in an axial opening of said column.

2. The camera support structure according to claim 1, wherein said universal adapter includes a threaded stem projecting from an end thereof opposite an end containing said tapholes, for attachment to said head piece.

3. The camera support structure according to claim 2, wherein said universal adapter includes a screw-threaded taphole extending transversely relative to an axis of said stem.

4. The camera support structure according to claim 1, wherein said base seat includes a first end into which a main taphole extends parallel to, and offset from, a center axis of said base seat, a transverse taphole extending through a side wall of said base seat and into said main taphole in a direction perpendicular to said main taphole and intersecting said main taphole, and a plurality of inclined threaded tapholes extending at an acute angle relative to said main taphole for receiving said supporting legs.

5. The camera support structure according to claim 4, wherein said base seat further includes a recess formed in a second end thereof, and a groove formed in an external surface of said side wall of said base seat.

6. The camera supporting according to claim 1, wherein said slide bushing includes a longitudinal guide bore for receiving said column, transverse insertion openings extending into said guide bore through a side wall of said slide bushing, and threaded tapholes extending parallel to said guide bore.

7. The camera support structure according to claim 6, wherein said insertion openings are parallel to one another.

8. The camera support structure according to claim 1 further including an extension rod having a threaded stem at one end and a taphole at another end, said extension rod being selectively connectible to said base seat and said slide bushing.

9. The camera support structure according to claim 1 further including a cord having fasteners at its ends and being connectible selectively to said base seat and said slide bushing.

10. The camera support structure according to claim 9, wherein said fasteners comprise threaded stems.

11. The camera supporting structure according to claim 1, further including a cloth member of generally triangular shape having straps insertable onto respective supporting legs.

12. The camera supporting structure according to claim 11, wherein said cloth member includes a holder for attachment to a user's body.

13. The camera supporting structure according to claim 12, wherein said cloth member includes a threaded stem and openings disposed along side edges of said cloth member, said side edges converging in a direction away from said straps.

14. The camera supporting structure according to claim 13, wherein said openings comprise slits.

15. The camera supporting structure according to claim 11, wherein said cloth member is formed of leather.

16. The camera supporting structure according to claim 1, wherein said column comprises telescoping elements.

17. The camera supporting structure according to claim 1, wherein said head piece includes a ball and socket joint to permit swiveling of a camera.

18. The camera supporting structure according to claim 17, wherein said ball of said joint includes a slot extending partially therethrough, and a taphole extending through said ball transversely to said slot and intersecting said slot at a center of said ball.

19. The camera supporting structure according to claim 18, wherein said ball carries a threaded stem lying in a plane containing said slot.

20. The camera supporting structure according to claim 19, wherein said socket is formed by two disk-shaped plates, one of said plates containing uniform grooves, and the other plate including a sloped opening forming a mouth of a recess in which said ball is received.

21. The camera supporting structure according to claim 20, further including a dowel pin threadably securable to said taphole of said ball for expanding said dish-shaped plates.

22. A camera support structure comprising:

a cylindrical column, a base seat member including a bushing insertable into a first open end of said column, said base seat including a plurality of threaded tapholes;

a slide bushing having a through-bore for receiving said column to enable said slide bushing to be adjustably movable along said column, said slide bushing including a plurality of threaded tapholes, and a recess, a universal adapter including a first end mountable in said recess of said slide bushing to project therefrom in a direction transversely of a longitudinal axis of said column;

a plurality of threaded rods selectively mountable in said tapholes of said base seat member and said slide bushing; and a camera supporting unit selectively mountable to a second end of said universal adapter and a second open end of said column.

23. The structure according to claim 22, wherein said base seat member includes a groove formed in an outer surface thereof, said structure further comprising a spindle rod mountable in said groove and threadably securable in a taphole formed in said slide bushing to extend parallel to said axis of said column for interconnecting said base seat member and said slide bushing and displacing said slide bushing along said column.

* * * * *